Patented Jan. 19, 1932

1,841,876

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

OIL-SOLUBLE-DYE AND PROCESS OF MAKING THE SAME

No Drawing.    Application filed May 16, 1927.   Serial No. 191,929.

This invention relates to a process for imparting solubility in hydrocarbons and oils generally, to dyestuffs which are normally insoluble therein and to enhancing the solubility in hydrocarbons of dyestuffs which are otherwise sparingly soluble. Dyestuffs soluble in oils, and particularly in hydrocarbon oils, such as petroleum distillates, are required for a number of purposes including, among others, printing in colors. The number of dyestuffs which show sufficient solubility for this use is limited.

I have found that various dyestuffs insoluble in hydrocarbons, can be made soluble, and dyestuffs of limited solubility in hydrocarbons can be made more easily soluble, by causing the same to combine with an oil soluble sulphonic acid, derived from petroleum. The dyestuffs which can be made to react in this manner are organic and contain a basic group either in combination with an acid or capable of combining with an acid. The following specific dyestuffs are illustrative of the general class referred to, although this invention is not limited in any way to those specifically mentioned: Victoria green, Bismarck brown, malachite green, methyl violet, nigrosine and methylene blue. The oil-soluble sulphonic acids referred to are those products resulting from the treatment of petroleum and/or petroleum distillates with concentrated sulphuric acid, fuming sulphuric acid or sulphuric anhydrid. At the conclusion of such treatment, the residual sulphuric acid, together with organic matters, settles out as a sludge and is withdrawn. Certain acids are found in the oil phase. These acids are characterized by the presence of sulphur in combination and are predominantly oil-soluble. For the purposes of this application, they are termed oil-soluble sulphonic acids.

The combination of the dyestuffs with the sulphonic acid may be brought about by contacting the dyestuff with the sulphonic acid, or a salt thereof in an acid medium. I may, for this purpose employ any medium, such as water, alcohol or hydrocarbon. I may, for instance, mix the dyestuff to be converted with a solution of sulphonic acids in oil as obtained by the acid treatment of the petroleum distillate above referred to, or I may extract these sulphonic acids from the oil phase by the use of solvents therefor, such as a mixture of alcohol and water, and so employ them, or I may neutralize these sulphonic acids either before or after extraction with any suitable base, and employ either the alcohol-water solution thereof, or evaporate off the solvent and utilize the salt of the sulphonic acid so obtained.

My preferred method of operation, however, consists in reacting the dyestuff to be converted and the sulphonic acid or salt thereof in an aqueous medium. The sulphonic acid is preferably employed in the form of its alkali metal salt. If the dye is employed in the form of its uncombined base, the system should be in acid condition and if a salt of the sulphonic acid is employed as distinguished from the sulphonic acid per se, I add to the system a quantity of acid, either organic or inorganic sufficient to liberate the sulfonic acid. It will, of course be understood that the reaction will be accelerated by agitation and moderate heating. I find it preferable to work in a dilute aqueous solution and to add thereto sufficient mineral acid such as hydrochloric or sulphuric to precipitate the oil soluble dyestuff, which acid is preferably added subsequent to the mixing of the reactants. The exact amount of mineral acid to be added for this purpose will, of course, vary in response to the concentration of the solution, and the particular dyestuff formed.

The dyestuff so made is ordinarily separated from the solution and dried. If further purification is desired, it may be dissolved in organic solvents of low boiling point such as, for instance, benzol, chloroform, alcohol, etc., and the solvent subsequently removed by evaporation. It will be understood that the specific procedure outline is not in any sense limitative and that my invention comprehends generally the formation of oil-soluble dyestuffs by causing dyestuffs of the class hereinbefore mentioned to combine with an oil-soluble sulphonic acid formed by the treatment of petroleum or its distillates with sulphuric acid.

What I claim is:

1. The method of rendering dyestuffs soluble in hydrocarbons, which comprises causing an organic dyestuff containing a basic group to react with an oil-soluble sulphonic acid derived from the treatment of a petroleum oil with sulphuric acid.

2. The method of making oil-soluble dyestuffs, which comprises causing an organic dyestuff containing a basic group to react with an oil-soluble sulphonic acid derived from the treatment of a petroleum oil with fuming sulphuric acid or sulphuric anhydrid.

3. The method, according to claim 2, in which reaction takes place in an aqueous medium.

4. The method of rendering dyestuffs soluble in hydrocarbons, which comprises causing an organic dyestuff containing a basic group to combine in an acid medium with oil-soluble sulphonic acid derived from the treatment of a petroleum oil with sulphuric acid.

5. An oil-soluble product comprising an organic dyestuff, normally substantially insoluble in oils, in combination with an oil-soluble sulphonic acid derived from petroleum.

6. The method according to claim 2 in which the reaction takes place in an aqueous acid medium.

7. The method according to claim 2 in which the reaction is carried out in an aqueous medium in the presence of free acid and an alkali metal salt of the sulfonic acid whereby the sulfonic acid is obtained by action of said free acid upon said alkali metal salt.

HYYM E. BUC.